United States Patent [19]

Chenausky et al.

[11] 4,363,126
[45] Dec. 7, 1982

[54] TUNED-CIRCUIT RF-EXCITED LASER

[75] Inventors: Peter P. Chenausky, Avon; Erroll H. Drinkwater, Portland; Lanny M. Laughman, Bolton, all of Conn.

[73] Assignee: United Technologies Corporation, Hartford, Conn.

[21] Appl. No.: 214,858

[22] Filed: Dec. 10, 1980

[51] Int. Cl.³ ............................................... H01S 3/09
[52] U.S. Cl. ......................................... 372/38; 372/82
[58] Field of Search ........................ 372/64, 82, 83, 38

[56] References Cited

U.S. PATENT DOCUMENTS 4,169,251  9/1979  Laakmann ............................. 372/64
4,258,335  3/1981  Donon ................................... 372/83

Primary Examiner—James W. Davie
Attorney, Agent, or Firm—Eric W. Petraske

[57] ABSTRACT

An RF-excited gas laser is improved by the addition of an inductor in parallel with a discharge resistance Rg and capacitance $C_{wg}$ to form a tuned circuit having a resonance frequency such that the real part of the complex impedance of the discharge chamber is matched to the output impedance of a driving oscillator and by the use of an input circuit that compensates for the imaginary part of the discharge chamber impedance.

4 Claims, 6 Drawing Figures

TUNED-CIRCUIT RF-EXCITED LASER

DESCRIPTION

1. Technical Field

The invention relates to an improved RF-excited gaseous laser, in which the laser discharge structure has a radio frequency resonance frequency having a predetermined relationship to an RF driving frequency.

2. Background Art

U.S. Pat. No. 4,169,251 shows an RF-excited discharge laser having a discharge chamber structure with a complex impedance that is modelled by a parallel R-C combination. FIG. 1 shows a schematic of this device, in which the reactive component of impedance of discharge structure 21 is cancelled by a pi impedance matching network 11, so that the total impedance presented to oscillator 4 will be matched to the oscillator and cable impedance for better power transfer.

DISCLOSURE OF INVENTION

According to the invention, an RF-excited gas laser is improved by the addition of an inductive element in parallel with a discharge chamber resistance and capacitance. The value of the inductance is chosen such that the resonant frequency of the discharge-chamber tuned circuit that is created by the addition of the inductive element has a predetermined relationship to the RF driving frequency of the laser.

BEST MODE OF CARRYING OUT THE INVENTION

Figure 2:
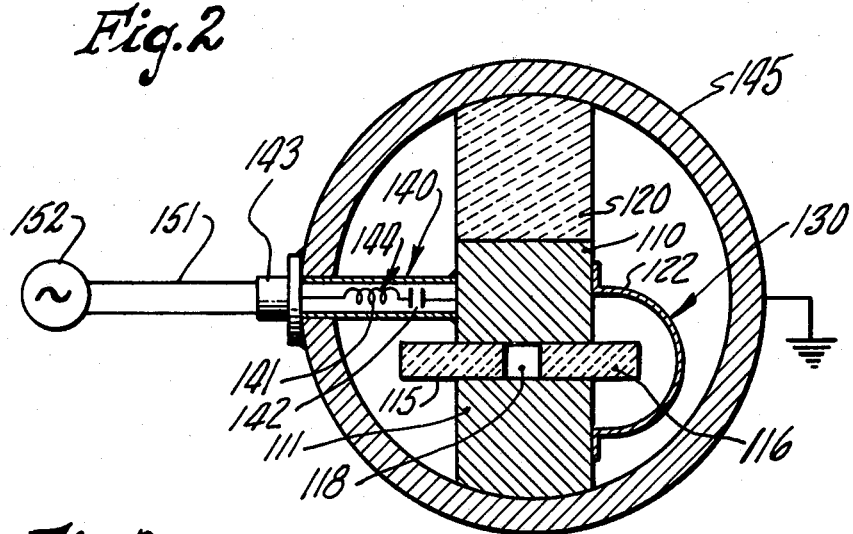
FIG. 2 shows, in partially pictorial, partially schematic form, an embodiment of the invention.

In FIG. 2, a preferred embodiment of the invention is illustrated, in which optical waveguide discharge chamber 118 is bracketed by electrodes 110 and 111 and dielectric spacers 115 and 116. These elements are spaced to form an optical cavity having transverse dimensions of 2.5 mm and a length perpendicular to the plane of the drawing of 34 cm. The cavity is further defined by conventional mirrors, not shown in the drawing, for resonating laser radiation. The electrical properties of the discharge structure are altered by the addition of lumped-constant inductor 122 that has an inductance that is chosen to form a resonant circuit having the form of a parallel resistance, capacitance and inductance and a resonance frequency having a predetermined relationship to the frequency of driving oscillator 152 that supplies power to the discharge. Ceramic spacer 120 provides a heat path for cooling electrode 110 by conduction to cylindrical member 145 that performs the dual function of providing RF shielding and confining the low pressure of the laser gas. The interior of cylinder 145 is evacuated and filled with a lasing gas mixture to a predetermined pressure, illustratively, a conventional $CO_2$, $N_2$, He mixture at 90 torr. Discharge chamber 118 is in communication with the interior of cylinder 145 so that the gas outside the chamber serves as a reservoir.

Power is applied to discharge structure 130 through input series impedance circuit 144, comprising inductor 141 and capacitor 142, both enclosed in insulating tube 140 that is sealed to electrode 110 and open to the atmosphere, so that discharges will not be formed from the elements of circuit 144. Circuit 144 is connected by 50-ohm connector 143 to cable 151 and thus to RF oscillator 152. Illustratively, oscillator 152 has a standard real output impedance of 50 ohms, as does cable 151.

Figure 1:
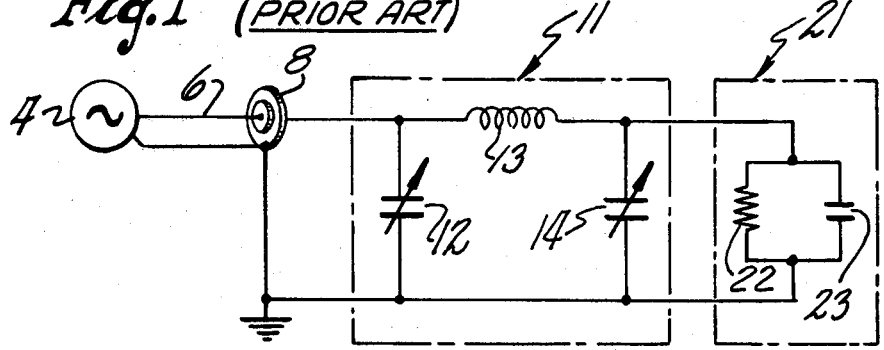
FIG. 1 shows, in partially pictorial, partially schematic form, a prior art RF-excited laser.
Figure 3:
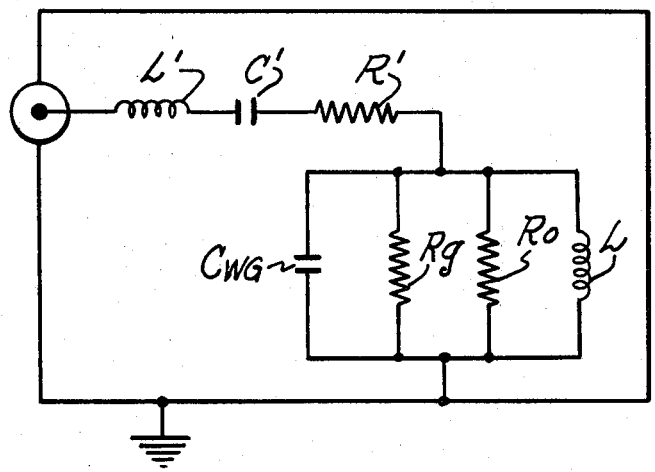
FIG. 3 shows an equivalent circuit diagram of the embodiment of FIG. 2.
Figure 4:
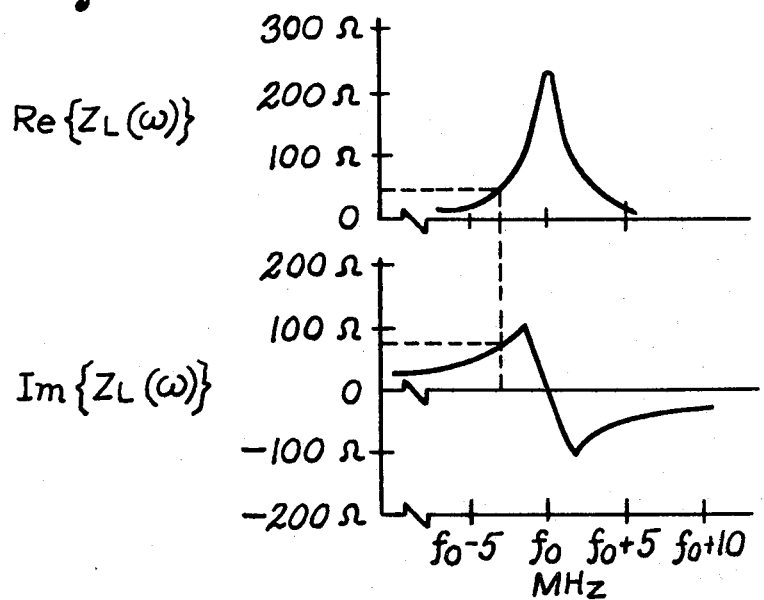
FIG. 4 shows a graph illustrating the frequency dependence of the discharge chamber impedance.

According to a feature of the present invention, electrodes 110 and 111 are large compared to the dimensions of cavity 118 but are separated by dielectric spacers 115 and 116, illustratively made from material having a high dielectric constant, such as alumina or berylia. This feature not only permits effective cooling, but also permits the capacitance of structure 130 to be considerably greater than the capacitance of the corresponding structure in the prior art. In the prior art, efforts were made to minimize the capacitance of the structure in order to increase the real component of impedance resulting from the parallel combination of electrode capacitance and the gas discharge resistive dissipation. The high capacitance of the preferred embodiment is combined with the inductance of inductor 122 to give a resonant frequency that is appropriate to the length of the discharge. If the resonant frequency of the structure is unduly high so that the RF wavelength is much less than the length of the chamber, then the discharge region will not be uniformly excited and not all of the potential laser gain will be achieved. The circuit of FIG. 2 can be modelled as shown schematically in FIG. 3, where Rg is the impedance of the gas discharge, Ro is the loss associated with the inductance, L is the lumped-constant inductance and $C_{wg}$ is the waveguide capacitance and L', C' and R' are the values for the input circuit. In FIG. 4, the real and imaginary parts of the impedance of the parallel RLC circuit are shown for typical parameters of $C_{wg}=250$ pF, Rg=240 ohms, Ro=1500 ohms, L=0.01 $\mu$H and fo=100 $MH_z$. The impedance at resonance is the gas discharge impedance of 240 ohms in parallel with Ro, which is a poor match for the standard oscillator and cable impedances of 50 ohms. An oscillator and cable of 240 ohms impedance could be constructed in principle, or the prior art method shown in FIG. 1 could be employed, in which oscillator 4 and cable 6 deliver RF power at 50 ohms to connector 8. The discharge region in this prior art device is a parallel R-C circuit 21 with resistor 22 and capacitor 23. The impedance of circuit 21 is matched to 50 ohms by conventional pi network 11 comprising two variable capacitors and an inductor. Since the prior art discharge region is not a tuned circuit by itself, the effect of the electrode capacitance is to reduce the real component of impedance for the parallel circuit formed by the electrode capacitance and resistive discharge. For components in the prior art configuration, low values of real impedance can lead to substantial power dissipation in the required matching network. Because the prior art discharge region was not a tuned circuit, the prior art did not have an additional degree of freedom that permits the present invention to increase the capacitance of the discharge area, resulting in a higher unloaded circuit Q, thereby improving the ratio of the parallel combination of Rg and Ro to Ro alone and thus reducing the amount of RF power applied to the circuit losses and correspondingly increasing the power delivered to the discharge.

According to the present invention, the system may be operated at resonance and the input circuit designed for minimum influence on the frequency of operation if the parameters of the discharge region (gas pressure, length, transverse dimension, etc.) combine to produce an impedance at resonance that is matched to the available oscillator. Alternatively, according to the invention, the operating frequency may be shifted slightly from the resonant frequency by an amount chosen to produce a real component of impedance that is matched to the oscillator impedance and the input circuit is chosen to compensate for the imaginary component of the discharge circuit impedance at this non-resonant frequency. Typical values for the input parameters are: $L'=0.1$ $\mu H$, $C'=15$ pf and a series resistance of 0.01 to 0.1 ohm. The operating point of the preferred embodiment is indicated by the dotted lines in FIG. 4, showing that a shift of only 3% of the operating frequency produces the desired impedance shift. The operating frequency may be either above or below the resonant frequency, with the input impedance being either primarily inductive or capacitive in order to effect compensation for the residual reactive component of the discharge circuit.

Figure 5:
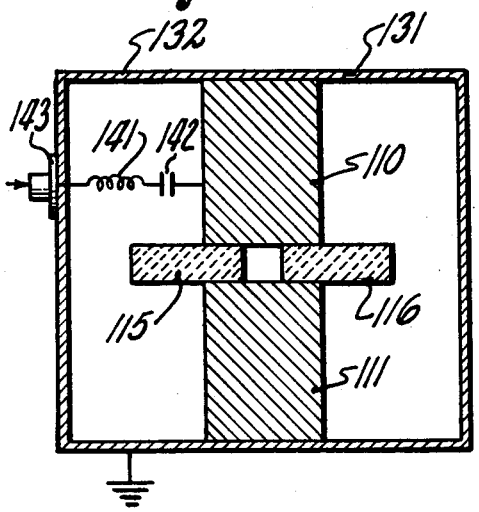
FIG. 5 shows, in partially pictorial, partially schematic form, an embodiment of the invention.

An alternative embodiment of the invention is illustrated in FIG. 5, in which the lumped inductors 131 and 132 form the walls of the gas enclosure and also provide RF shielding, and electrode 110 extends to the outer wall for thermal and electrical contact. This embodiment has two inductors in parallel in the parallel RLC discharge circuit and tends to give a relatively high resonant frequency that has the undesirable side effect that the ends of the discharge have a different voltage than the middle. This embodiment may be used to advantage if the length of the discharge region need not be as long as the approximately 34 cm. used for the illustrative embodiment or if the transverse dimensions of the discharge region result in a capacitance that requires a smaller inductance.

Figure 6:
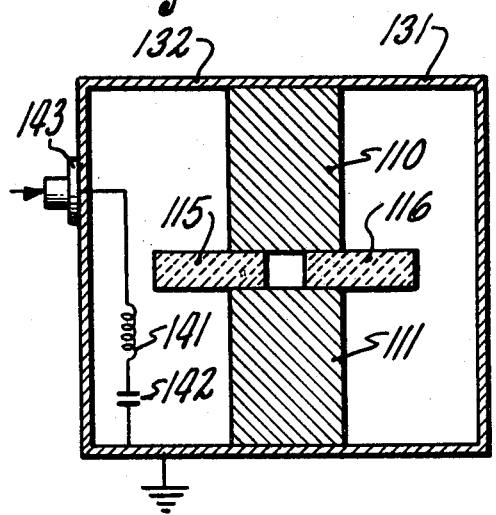
FIG. 6 shows, in partially pictorial, partially schematic form, another embodiment of the invention.

FIG. 6 illustrates yet another embodiment, in which the input is inductively coupled and inductor 141 couples the input power to inductor 132, which now forms the quadruple functions of RF shield, vacuum enclosure, lumped inductor and input coupling element.

The preferred embodiment is a waveguide laser, but the invention applies to other RF-excited lasers, either CW or pulsed. Other embodiments of the invention will be evident to those skilled in the art, and it is intended that the following claims include such embodiments and not be limited to those embodiments illustrated above.

We claim:

1. A radio frequency-excited gas laser comprising:
    an optical resonant cavity having electrodes disposed on opposite sides thereof and a lasing gas therein, said optical cavity having a cavity capacitance;
    radio frequency means having an output impedance for establishing a radio frequency electric discharge of a predetermined driving frequency through said lasing gas, whereby optical radiation is resonated in said optical cavity, said discharge having a discharge resistance in parallel with said cavity capacitance, forming a cavity impedance that is a complex number; and
    an input impedance circuit connected to at least one of said electrodes and to said radio frequency means for coupling power from said radio frequency means to said radio frequency electrode discharge, said input impedance circuit having a complex impedance the imaginary part of which substantially cancels the imaginary part of said cavity impedance at said driving frequency, characterized in that: at least one inductance is connected between said electrodes in parallel with said discharge resistance and cavity capacitance to form an electrical resonant circuit having a complex RLC impedance and a predetermined resonant frequency.

2. A laser according to claim 1, in which said driving frequency differs from said resonant frequency by a predetermined amount such that the real part of said RLC impedance is substantially equal to said output impedance.

3. A laser according to claims 1 or 2, in which said at least one inductive element is shaped to form an enclosure for confining a quantity of said laser gas in communication with said optical cavity.

4. A laser according to claim 3, in which said at least one inductive element is thermally connected to said electrodes and in which said at least one inductive element is disposed about said electrodes to form a Faraday cage.

* * * * *